RECORDING SYSTEM

Filed April 21, 1954 2 Sheets-Sheet 1

INVENTOR
JOHN L. McLUCAS
BY Mitchell & Bechert
ATTORNEYS

Nov. 18, 1958 J. L. McLUCAS 2,861,263

RECORDING SYSTEM

Filed April 21, 1954 2 Sheets-Sheet 2

INVENTOR
JOHN L. McLUCAS
BY Mitchell & Bechert
ATTORNEYS

United States Patent Office 2,861,263
Patented Nov. 18, 1958

2,861,263

RECORDING SYSTEM

John L. McLucas, State College, Pa., assignor to Haller, Raymond and Brown, Inc., State College, Pa., a corporation of Pennsylvania Application April 21, 1954, Serial No. 424,667

21 Claims. (Cl. 343—6)

My invention relates to means for compressing the band-width of radar-video signals and for creating a P. P. I. or other display from the compressed-video signal.

It is an object of the invention to provide improved means of the character indicated.

It is a specific object to provide improved means for storing radar signals and for currently or later creating a P. P. I. or other display from the stored signals.

It is a specific object to meet the above objects with a device which will permit the simultaneous recording of a radar-video signal and of the voice comment applicable thereto, as in the case of airport radars for which the voice communication with aircraft provides important supplemental information.

It is a further specific object to provide, in conjunction with an airport radar or the like, means for storing continuously the most recent five, ten, or fifteen minutes of data, there being provision for selectively preserving at any time the latest recorded interval, as when an accident occurs and the sequence of events preceding the accident must be re-created for purposes of conducting an investigation or hearing.

Other objects and various features of novelty and invention will be pointed out or will occur to those skilled in the art from a reading of the following specification in conjunction with the accompanying drawings. In said drawings, which show, for illustrative purposes only, preferred forms of the invention:

Briefly stated, my invention contemplates improved means for compressing the bandwidth of a radar-video signal so that it can be handled on a conventional communication channel, such as a radio link or tape recorder, and for creating or re-creating from the compressed intelligence a display having quality approaching that potentially available from the original radar-video signal. Simultaneously, I provide for voice recording and playback so as to complete the total intelligence attending the radar situation. As part of the audible presentation, I establish an antenna reference-bearing mark, of which the observer can be audibly aware, say, once for every full rotation of the antenna. The operator or observer can then either mentally, or through manual or automatic means, correct his display axis for proper coordination with the antenna-reference orientation.

Figure 1:
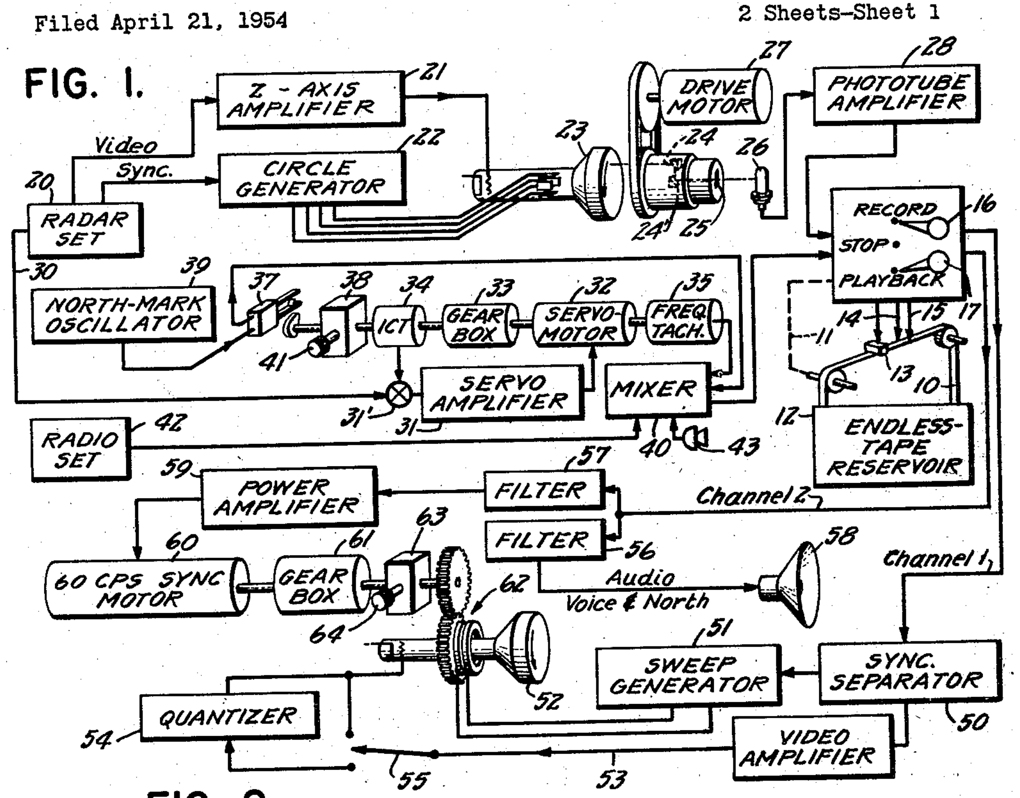
Fig. 1 is an electrical block diagram schematically illustrating components of a complete recording-and-playback mechanism incorporating features of the invention.

In Fig. 1, my invention is shown in application to two-channel recording on a strip of magnetic tape 10 continuously driven by means suggested at 11. The tape 10 may be of the fixed-length variety, commercially available on reels and thus adapted for storage and cataloging, or the tape can be a single endless strip, as suggested by the reservoir 12, and accommodating, say, only the latest ten or fifteen minutes (or any other desired interval) of recorded data. For such purposes, the recording device may also include means 13 for erasing any signals older than the length of time accommodated by the tape 10. Commercially available tape 10 accommodates two channels, and I have shown two heads 14—15 for separate simultaneous recording on the two channels. The heads 14—15 may also be employed for playback purposes.

The controls for the recorder may be conventional or specially adapted for particular purposes, but I have merely shown two selector knobs 16—17 for selecting desired operations. The knob 16 may determine whether further recordings are to be made, and by switching the same to the position labeled "stop" a given recording will be preserved and the erasing head will be disabled. The knob 17 may be employed for selection of playback, which will cause delayed creation of a display. As long as the knob 16 is in the position shown, and if the knob 17 is in the "stop" position, the input intelligence will not only pass to the recorder heads 14—15 but will also be channeled to the display device. If the selector knob 16 is switched to the "stop" position, and if the knob 17 is in the "playback" position, the display will derive its intelligence from playback of the recorded tape; and, of course, if both knobs 16—17 are in the "stop" position, there will be no display.

Figures 2, 3:
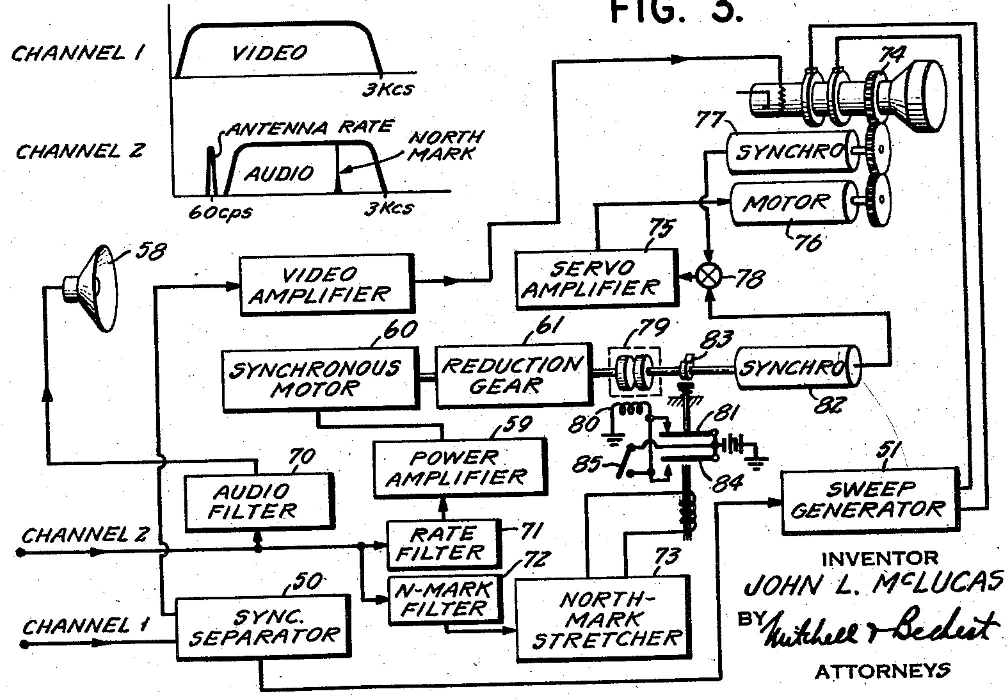
Fig. 2 is a graphical presentation of frequency allocation in the system of Fig. 1.
Fig. 3 is a view similar to Fig. 1 but illustrating an alternative playback mechanism.

As indicated generally above, both the radar video and the voice intelligence are applied simultaneously to the tape 10. In Fig. 2, I indicate my preference for utilizing one channel solely for the video intelligence, and the other channel for audio and orientation signals. The video-bandwidth requirements are determined basically by the radar-antenna beamwidth, by the antenna rate, and by the number of desired range elements in the ultimate display. For many purposes, a 3 kc. band will suffice, and I have indicated such bandwidth in Fig. 2. Under these circumstances, the standard 3¾ in./sec. tape feed will be adequate. For faster-scan radars a greater bandwidth may be necessary to accommodate the compressed video signal, but by merely changing the drive speed at 11 the recorder can be made to handle such compressed video in one channel.

In the other channel, I indicate my preference for accommodating antenna-orientation data and the voice intelligence at one and the same time. In the form shown, antenna orientation is available from two sources: a rate signal continuously following the antenna, and a reference-bearing signal, which for convenience can be called a "north" mark. I have shown the rate signal as at 60 C. P. S. and this may be rendered sub-audible by suitable filtering means; on the other hand, I prefer that the reference-bearing or north-mark signal shall be squarely within the audible range.

Specifically, in the case of Fig. 1, a radar set 20 may provide video and synchronizing signals separately to a Z-axis amplifier 21 and to a circle generator 22, for creating a circular, intensity-modulated or J-scope presentation on a cathode-ray tube 23. The recurrence rate for the sweep of tube 23 will be the pulse-repetition frequency of the radar. In order to compress the bandwidth of the radar signals, I employ a mechanically rotating optical system comprising periscope mirrors 24—24′ and a slit 25, enabling a photo-tube 26 to follow the circle display of tube 23. Relying on the persistence characteristics of the face of tube 23, a drive motor 27 may rotate the mirrors 24—24′ to scan the face of tube 23 at a very much slower rate than the circle frequency on tube 23. Thus, photo-tube 26 may develop a slowed-down video signal, which, with suitable amplification at 28, may be applied directly to the tape 10, as through the recording head 14 and over the spectrum designated "video" in Fig. 2.

Antenna-rate signals may be available in line 30 from the radar set 20, which, for this purpose, may include a tachometer or other device following the antenna shaft. I have shown the antenna-rate signal feeding a servo-amplifier 31 through differential means 31′. Amplifier 31 forms part of a loop consisting of a servo-motor 32, a reduction gear 33, and a control transformer 34, also connected to the differential means 32. A frequency tachometer 35 is driven by the servo-motor 32 and develops the signal designated in Fig. 2 as more or less 60 cycles; this signal is shown supplied to the channel 2 (recording head 15) input to the recorder, via mixing means 40. While the signal output of tachometer 35 may be sufficient to establish continuous synchronism in the ultimate display, I prefer to employ additional means to supply reference-bearing data and have shown a simple cam-operated switch 37 driven through differential gearing 38 by the shaft of control transformer 34. Switch 37 serves once every antenna revolution to provide a keyed signal from a reference-mark oscillator 39 to mixing means 40, and by means of manual adjustment knob 41 this reference mark may be caused to occur at a particular desired bearing, such as "north." Once this adjustment has been made for any particular radar installation, no further manipulation is necessary.

In accordance with a feature of the invention, I superpose on the antenna-orientation data supplied to mixer 40 a band of voice intelligence, which may be merely spoken commentary at the recording station or, as suggested in Fig. 1, may be available from a radio set, such as an air-to ground voice radio 42; also, I have indicated at 43 a microphone for adding any further local comment. The frequency of oscillator 39 is, as suggested in Fig. 2, preferably such as to place the "north" mark or tone squarely within the audible range.

With the apparatus thus far described, continuous two-channel recordings will be perpetually applied to and erased from the tape 10, but the tape 10 will always contain a full latest length of recorded information. If this recording is to be preserved for later analysis, it is merely necessary to operate the knob 16 so as to disable the erasing head 13, and both recording heads will be deprived of their recording function.

For purposes of re-creating the display and voice recording, I have shown, for compressed video of channel 1, means 50 for separating a synchronizing signal, that is, a signal reflecting the pulse-repetition rate of the slowed-down video, for use in triggering a radial-sweep generator 51 to control the display on cathode-ray tube 52. The slowed-down video is passed in line 53 to the intensity-modulation means of the display tube 52. In cases where the signal-to-noise ratio is adequate, I find it advantageous to employ a quantizing circuit 54 for limiting the intensity of all signals to a given threshhold; a manual switch 55 provides this feature on a selective-availability basis.

With regard to channel 2, as played back from the tape 10, a first filter 56 may discriminate against the antenna-rate signal and thus provide, for audio presentation at 57, both the voice intelligence and the antenna-reference mark, which will appear as a short, keyed signal every time the antenna passes through the reference bearing. Further filtering means 57 may discriminate against the audio intelligence and thus pass the antenna-rate signal to a power amplifier 59, to a synchronous-drive motor 60, to reduction gearing 61, and to the drive means 62, for orienting the instantaneous display axis of the tube 52. I find it convenient to place differential means in this latter chain of connections and have provided differential-gear means 63, with manual means 64 for adjusting the same.

In operation, the observer may manipulate knob 17 to start the playback of a recorded tape at any time, and the display will be properly coordinated in every respect except for the antenna-reference bearing. The audio-presentation means 58 will, however, once for each antenna rotation, supply the keyed marker pulse which the observer can recognize and compare with the instantaneous display axis. By adjustably manipulating the knob 64, for one or a few more successive rotations of the antenna, complete orientation accuracy in the display may be established.

In Fig. 3, I show a slightly modified playback arrangement, in which antenna-orientation signals are automatically interpreted to create the proper orientation of the display axis in the re-created P. P. I. Many of the parts in Fig. 3 may be the same as described in Fig. 1 and have, therefore, been given the same reference numerals. For the automatically correcting arrangement of Fig. 3, it may not be desirable to have the north or reference-bearing mark occur in the audible range, and therefore the north-mark oscillator 39 may be at a frequency that is either subaudible or above the voice-intelligence band. In any case, filters 70—71—72, suitably responsive to the several signals mixed in channel 2, may supply the desired voice intelligence for presentation at speaker 58, the antenna-rate signal for supply to the power amplifier 59, and the north-mark signal for supply to what I have termed a north-mark stretcher 73. Stretcher 73 is merely a means providing an output pulse for each input or north-mark pulse, the output pulse being of greater duration, as will appear more clearly below.

The drive to the display yoke 74 may comprise a loop including a servo-amplifier 75, motor 76, and synchro-generator 77 connected through differential means 78. If directly connected, the motor 76 could run synchronously with the rate signal available at power amplifier 59, but I have provided an intermediate control coupling in the form of a clutch 79 between these parts. The clutch may be driven by a synchronous motor 60 and reduction gear 61, and may follow such drive only when energized, as at winding 80. A synchro 82 may be driven by clutch 79 and apply an electrical input to means 78 for differential combination with those provided by pick-off synchro 77, to drive motor 76.

Through switching means 81, the winding 80 is normally energized, and therefore synchro 82 more or less continuously feeds the differential 78. However, cam means 83 is effective once per cycle to trip switch 81 and thus to disconnect the clutch 79, provided that a further switch 84 happens to be open at the same time. If this trip of switch 81 occurs before a north-mark signal arrives, then the clutch 79 will be disengaged, and cam 83 will hold switch 81 open until clutch 79 is re-engaged. If, however, the north-mark signal arrives before switch 81 is tripped, then the delay inherent in operation of stretcher 73 will establish temporary closure of switch means 84 in parallel with switch 81, to hold-in the circuit to clutch 79; to avoid any interruption of clutch action in the event the north-mark occurs at the proper bearing, and at the same time to avoid introduction of bearing error, the delay period characteristic of stretcher 73 is preferably a minimum and is just long enough to permit clutch re-engagement and the movement of cam 83 off switch 81. When the operator is satisfied that the display axis has been properly co-ordinated with the antenna-reference mark, he may disable the correcting mechanism, as by manually closing a switch 85, so that thereafter synchronous drive is maintained at the yoke 74.

Figure 4:
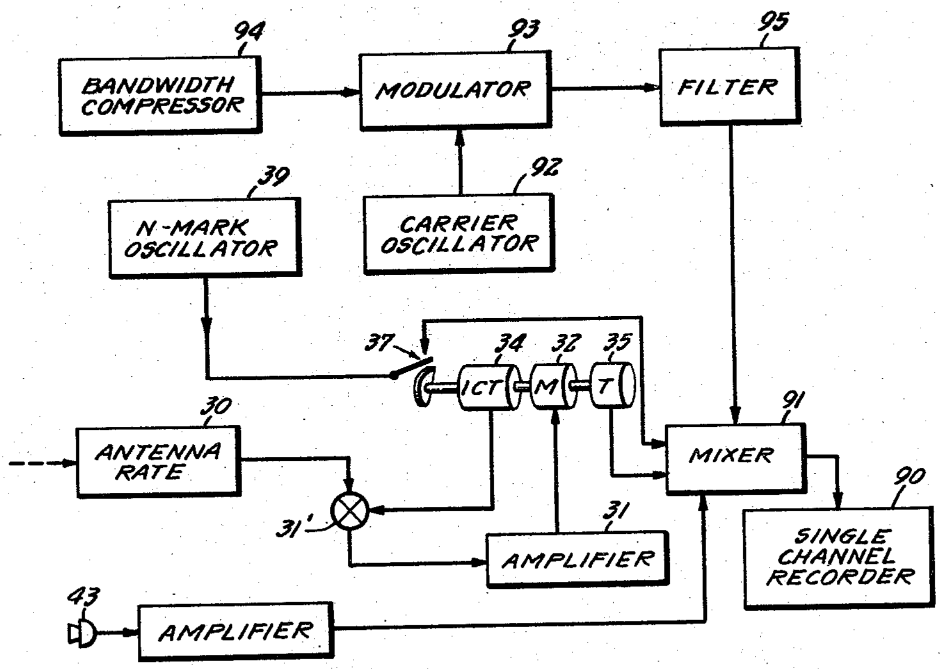
Fig. 4 is a view similar to Fig. 1, but illustrating an alternative recording mechanism.
Figure 5:
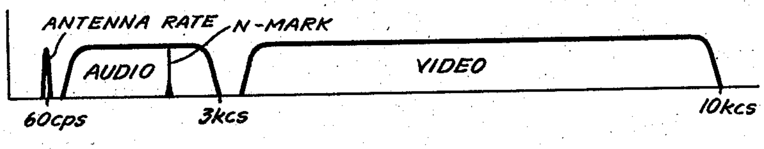
Fig. 5 is a view similar to Fig. 2, illustrating frequency allocation in the system of Fig. 4.

In Figs. 4 and 5, I show a modification in which a single channel of recording tape accommodated in recorder 90, accepts not only the video (that is, the slowed-down video) necessary for re-creation of the P. P. I. display, but also the audio intelligence and the antenna-orientation signals. As inputs to the mixing means 91, the antenna-rate, north-mark, and voice-intelligence components of the system of Fig. 4 may be as described for Fig. 1 and have therefore been given the same reference numerals. For accommodating the slowed-down video, however, I employ a carrier oscillator 92 in conjunction with modulating means 93 to accept slowed-down video available at 94, as from the photo-multiplier output of the band compressor; to elevate this compressed intelligence above the audible range, filter means 95 may exclude unwanted components of the modulation and may apply, say, a single sideband directly to the mixer 91. In Fig. 5, I show accommodation of this single-sideband range in the spectrum extending just above the audible range to 10 kcs. Of course, in order to handle 10 kcs. of recorded intelligence with the required fidelity, it may be necessary to advance the speed of tape feed in recorder 90 over that discussed above in conjunction with Fig. 1. However, a commercial recorder, operating at the commercial speed of 15 in./sec., will easily handle the 10 kc. band indicated.

For playback purposes, the equipment may resemble that already described, with, of course, the exception of demodulating means necessary to eliminate the carrier frequency and to restore the slowed-down video signal. Such demodulation means is conventional and is therefore not shown.

It will be seen that I have described an extremely useful combination which may be adapted anywhere that P. P. I.-radar or similar information must be recorded. In application to airport radars, my device permits complete recreation of an accident situation, both in the P. P. I. display and in the voice commentary, including air-to-ground radio communication. My device aids in the study of air-traffic control procedures and attempted solution of control problems, where recorded data are extremely valuable in testing variations in procedures. Also, for the training of traffic-control operators or military radar personnel, the reproducibility afforded by my device can be of great benefit. Furthermore, for periodical maintenance checks and as a research tool, the recording of radar data with synchronized voice comment can save substantial time.

While I have described the invention in detail for the preferred forms shown, it will be understood that modifications may be made within the scope of the invention as defined in the claims which follow.

I claim:

1. In combination, a radar including a directional antenna and means for continuously rotating the same, receiver means developing a radar-video signal, a cathode-ray tube responsive to the radar-video signal and displaying such signal on essentially the same sweep base for each repetition cycle thereof, photo-responsive means scanning the display on said tube at a substantially slower rate than that represented by said repetition cycle, whereby a slowed-down video signal is developed, magnetic-recorder means and means for impressing two intelligence channels thereon, said slowed-down video signal being applied to one of said channels, means connected to the other of said channels and developing signals responsive to radar-antenna rate and to antenna-reference bearing, a P. P. I. display device including intensity-modulated means connected to said one channel and responsive to the slowed-down video, means including a differential connection connected to said other channel and responsive to radar-antenna rate for orienting the instantaneous display axis of said device, and audio-presentation means connected to said other channel and responsive to a given reference bearing of said antenna.

2. The combination according to claim 1, in which said channels are separate magnetic-tape tracks on said recorder means.

3. The combination according to claim 1, in which one of said channels includes carrier-modulating means responsive to signals applied thereto, both channels being impressed on a single magnetic track of said recorder means.

4. The combination of claim 1, in which said differential connection includes a manually operated control connection, whereby, upon noting the displayed antenna axis with reference to the timing of the audibly presented reference bearing and upon manipulation of said manually operated connection, the orientation of the displayed and audibly presented bearings may be coordinated.

5. In a device for encoding P. P. I.-radar intelligence for relay, recording, or like purposes, two signal-processing channels, band-compression means connected to a first of said channels and responsive to the radar-video signal and producing therefrom a substantially slowed-down video signal in said first channel, and synchronizing means responsive to radar-antenna orientation and including audio-signal generating means responsive to a given reference antenna orientation, said synchronizing means having an output feeding the second of said channels.

6. A device according to claim 5, and including magnetic-tape recorder means accommodating two channels, said first and second channels being simultaneously applied to the respective channels of said magnetic tape.

7. In a P. P. I. radar, band-compression means responsive to a radar-video signal and developing a substantially slowed-down video signal for use in creating a P. P. I. display, said slowed-down video signal being available in a first channel, a second channel, and means for applying voice intelligence and antenna-orientation intelligence to said second channel.

8. A device according to claim 7, in which said antenna-orientation intelligence includes a signal audible in the range of said voice intelligence.

9. In a P.P.I. radar, band-compression means responsive to a radar-video signal and developing therefrom a substantially slowed-down video signal for supply in a first channel, a second channel, and means for simultaneously applying a voice signal and an antenna-rate signal and an antenna reference-bearing signal to said second channel, said rate signal being at a frequency outside the band of voice intelligence, and said reference-bearing signal being audible in said band.

10. In combination, band-compression means responsive to a P. P. I.-radar video signal and developing therefrom a substantially slowed-down video signal, magnetic-recorder means, means for storing voice intelligence on said magnetic-recorder means, means responsive to an antenna-reference bearing and developing an audible signal, means for storing said audible signal on said magnetic-recorder means, and means including a carrier-frequency source operating at a frequency elevated above the voice frequencies impressed on said magnetic-recorder means for impressing said slowed-down video signal on said magnetic-recorder means simultaneously with the voice intelligence and the said antenna-reference bearing intelligence.

11. P. P. I.-display means, comprising magnetic-tape playback means including means for developing a slowed-down radar-video signal and an antenna-rate signal and an antenna-orientation signal from concurrent tape-recordings thereof, intensity-modulating means responsive to said slowed-down video, means for displacing the instantaneous display axis of said display means and responsive to antenna-rate intelligence developed from said tape for orienting the display axis of said display means.

12. A device according to claim 11, in which said last-defined means is automatically responsive to said orientation signal to orient said display axis.

13. A device according to claim 11, in which said last-defined means includes an audible signal and means for audibly reproducing the same.

14. The combination of claim 13, in which said last-defined means includes filtering means responsive to the antenna-orientation signal and rendering the same sub-audible as far as said audible reproducing means is concerned.

15. In combination, band-compression means responsive to the video signal from a P. P. I. radar and developing therefrom a substantially slowed-down video signal of a bandwidth accommodated on magnetic-recording tape or the like, an endless strip of magnetic-recording tape or the like and means for continuously driving the same, antenna reference-bearing marking means developing an audible signal and means for applying said audible signal to said tape concurrently with application of said slowed-down video signal, means for creating a P. P. I. display from said slowed-down video signal, said last-mentioned means including driving means for continuously rotating the instantaneous display axis, said driving means including a differential connection, and means for controlling said differential connection in response to the timing of said audible signal.

16. In combination, a two-channel magnetic-tape recorder, band-compression means responsive to a radar-video signal and developing therefrom a slowed-down video signal, means for impressing said slowed-down video signal on one channel of said tape, means for generating an antenna-orientation signal and for impressing the same on the other channel of said tape, and means for impressing voice intelligence on said other channel.

17. The combination of claim 16, in which said antenna-orientation signal is audible and identifies a single orientation of said antenna.

18. The combination of claim 16, in which said antenna-orientation signal is developed continuously with rotation of said antenna and is sub-audible.

19. In combination, magnetic recording means including an endless tape, whereby signals occurring over the latest given unit of time may be continuously recorded, said recorder including erasing means for erasing signals older than the length of time accommodatable on said tape, means for disabling said erasing means and for disabling the recording head so that a given recording over the latest said unit of time may be preserved, band-compression means responsive to a radar-video signal and developing therefrom a substantially slowed-down video signal connected for application to said recording head, antenna-rate responsive means for developing an antenna-rate signal connected for application to said recording-head means, and playbock means responsive to a recorded signal for creating a P. P. I. display from the recorded signals.

20. The combination of claim 19, in which said tape recorder is of the two-channel variety, one of said channels accepting the slowed-down video signal, and means for impressing voice intelligence on the other channel, said playback means including audio-presentation means responsive to said second channel, whereby both the P. P. I. display and the voice comment applicable thereto may be re-created as often as needed.

21. In combination, magnetic-tape recording means including a tape accommodating at least two channels of recorded intelligence, band-compression means responsive to a radar-vidoeo signal and developing therefrom a substantially slowed-down video signal for application to one channel of said recording means, means for simultaneously impressing voice intelligence on the other channel, antenna reference-bearing identifying means developing an audible signal and means for applying said audible signal to said other channel, and playback means simultaneously responsive to both recorded channels for creating a radar display and for audibly presenting the voice and the reference bearing intelligence.

References Cited in the file of this patent

UNITED STATES PATENTS

| | | |
|---|---|---|
| 1,883,907 | Hathaway | Oct. 25, 1932 |
| 2,310,197 | Hansell | Feb. 3, 1943 |
| 2,412,670 | Epstein | Dec. 17, 1946 |

OTHER REFERENCES

"A Proposed Airport Traffic Control Radar Control Recording System" (TM-5-12), by John L. McLucas, of January 29, 1953.